(12) United States Patent
Knoedler

(10) Patent No.: US 9,501,064 B2
(45) Date of Patent: Nov. 22, 2016

(54) METHOD OF SOLVING A CONTROL PROBLEM IN A PROCESSING PLANT

(71) Applicant: Z & J Technologies GmbH, Dueren (DE)

(72) Inventor: Marco Knoedler, Dueren (DE)

(73) Assignee: Z & J Technologies GmbH, Dueren (DE)

(*) Notice: Subject to any disclaimer, the term of this patent is extended or adjusted under 35 U.S.C. 154(b) by 681 days.

(21) Appl. No.: 13/892,723

(22) Filed: May 13, 2013

(65) Prior Publication Data
US 2013/0310953 A1  Nov. 21, 2013

(30) Foreign Application Priority Data
May 15, 2012 (DE) .................. 10 2012 104 216

(51) Int. Cl.
*G06F 19/00* (2011.01)
*G05D 7/06* (2006.01)
(Continued)

(52) U.S. Cl.
CPC ......... *G05D 7/0617* (2013.01); *B01J 19/0006* (2013.01); *B01J 19/24* (2013.01); *B01J 19/2415* (2013.01); *G05B 13/041* (2013.01); *G05B 17/02* (2013.01); *B01J 2219/00058* (2013.01); *B01J 2219/00123* (2013.01); *B01J 2219/00162* (2013.01); *B01J 2219/00164* (2013.01); *B01J 2219/00202* (2013.01); *B01J 2219/00218* (2013.01); *B01J 2219/00225* (2013.01); *B01J 2219/00231* (2013.01); *B01J 2219/00243* (2013.01); *B01J 2219/00247* (2013.01)

(58) Field of Classification Search
USPC ................. 700/22, 34, 41–43, 282
See application file for complete search history.

(56) References Cited

U.S. PATENT DOCUMENTS

| 4,349,869 A | * | 9/1982 | Prett | ........................ | B01D 3/42 |
| | | | | | 700/266 |
| 5,252,860 A | * | 10/1993 | McCarty | ................... | F02C 9/28 |
| | | | | | 290/40 R |

(Continued)

FOREIGN PATENT DOCUMENTS

| DE | 102004026979 A1 | 2/2005 |
| DE | 60214362 T2 | 9/2007 |
| WO | WO 02/086327 A1 | 10/2002 |

OTHER PUBLICATIONS

German Patent and Trade Mark Office, Office Action for Application No. 102012104216.0, mailed Mar. 20, 2013, 14 pages, Germany.

*Primary Examiner* — Kidest Bahta
(74) *Attorney, Agent, or Firm* — Alston & Bird LLP

(57) ABSTRACT

A method of solving a control problem in a processing plant is provided by modification of at least two manipulated variables within the manipulation range thereof, wherein the manipulated variables are associated with one or more processing unit(s), and the at least two manipulated variables affect at least one process variable of the processing plant. The method includes the following steps: establishing a value distribution of the at least one process variable for different value combinations of the at least two manipulated variables within the manipulation range thereof, taking into account one or more process parameter(s), and determining a control curve on the basis of the value distribution of the process variable for modifying the at least two manipulated variables in order to switch the processing plant from the start state to the end state, taking into account at least one boundary condition.

17 Claims, 4 Drawing Sheets

(51) Int. Cl.
  *G05B 13/04* (2006.01)
  *G05B 17/02* (2006.01)
  *B01J 19/00* (2006.01)
  *B01J 19/24* (2006.01)

(56) References Cited

U.S. PATENT DOCUMENTS

| | | | | |
|---|---|---|---|---|
| 5,467,265 | A * | 11/1995 | Yamada | F01K 13/02 700/276 |
| 5,640,491 | A * | 6/1997 | Bhat | B01D 3/425 706/23 |
| 6,122,577 | A * | 9/2000 | Mergenthaler | B60T 8/172 180/197 |
| 6,577,323 | B1 * | 6/2003 | Jamieson | G05B 23/0232 345/440 |
| 6,980,938 | B2 * | 12/2005 | Cutler | G05B 13/048 700/39 |
| 7,272,454 | B2 | 9/2007 | Wojsznis et al. | |
| 8,380,328 | B2 * | 2/2013 | Brooks | G05B 19/41875 700/29 |
| 2008/0082302 | A1 * | 4/2008 | Samardzija | G05B 23/021 703/2 |
| 2009/0125154 | A1 * | 5/2009 | Yli-Koski | G05D 7/0635 700/282 |
| 2010/0049460 | A1 * | 2/2010 | Hasegawa | H04L 45/128 702/81 |
| 2012/0003623 | A1 * | 1/2012 | Bartee | G05B 17/02 435/3 |
| 2012/0110298 | A1 * | 5/2012 | Matsuse | G06F 9/5016 711/206 |

* cited by examiner

METHOD OF SOLVING A CONTROL PROBLEM IN A PROCESSING PLANT

CROSS REFERENCE TO RELATED APPLICATIONS

This application is a nonprovisional application of and claims priority to and the benefit of German Application No. 10 2012 104 216.0, filed May 15, 2012, which is hereby incorporated by reference in its entirety.

BACKGROUND

Technical Field

The invention relates to a method of solving a control problem in a processing plant, in accordance with the preamble of claim 1.

Related Art

Methods of solving a control problem in a processing plant, for example in an ethylene plant for generating ethylene from crude petroleum, are known from the prior art. Such industrial control problems require a plurality of manipulated variables to be modified in order to switch the processing plant from one process state to another process state, but the modification of the manipulated variables affects one or more process variables, for example pressures in pipelines of the processing plant, which provide a crucial boundary condition for switching the plant from one state to another. The modification of the two manipulated variables must accordingly be controlled in such a way that one or more process variables remain within their permissible limit ranges during the switch between the states. For that purpose, the prior art employs generally sufficiently well-known open-loop and closed-loop control concepts, for example PID controllers, to modify the manipulated variables. The manipulated variables in question can be associated with any desired processing apparatus, especially valve devices, such as butterfly valves, gate valves, stopcocks or valves of any kind. The manipulated variables can therefore be, for example, the travel of a valve or gate valve, so that the manipulated variable determines, for example, the throttling of a flow of liquid or gas, especially in a pipeline of a processing plant.

It is usual for certain manipulated variables in a processing plant to be regarded as reference variables or to be set to a constant value in order to simplify the control problem and to use simple structures, such as, for example, PID controllers, which influence the manipulated variable in question. It is often the case that attention is not paid to the effect on particular characteristics or modifiable boundary conditions of the components in question or of the process. In particular, industrial valve devices and butterfly valves, together with their drive means, are important manipulated variables in the context of the problems mentioned above but are subject to relatively high stress, depending upon the control concept. For example, in the context of a known control variant having two cracked-gas gate valves in the ethylene process, a drive means for modifying a manipulated variable is constantly in operation, while a further drive means of a valve device keeps a process pressure within permissible limits by means of control movements. The latter valve device is thereby subjected to excessive stress which can result in reduced service life and faults in the processing plant.

The problem of the present invention is therefore that of providing a method of solving a control problem in a processing plant which takes account of significant factors, such as the mechanical characteristics of the processing units, such as valve devices or changes in process characteristics, and thus increases the service lives of the processing units with which the manipulated variables are associated and reduces the likelihood of their malfunctioning.

BRIEF SUMMARY

To solve the problem mentioned above, a method having the features of claim 1 is proposed. The method according to the invention for solving a control problem in a processing plant is used especially for switching the processing plant from a start state to an end state by modification of at least two manipulated variables within the manipulation range thereof, wherein the manipulated variables are associated with one or more processing unit(s), especially valves, valve devices or butterfly valves, and wherein the at least two manipulated variables affect at least one process variable of the processing plant, especially a pressure. The method is distinguished by the following steps: establishing a value distribution of the at least one process variable for different value combinations of the at least two manipulated variables within the manipulation range thereof, taking into account one or more process parameter(s), especially a temperature, a volumetric flow or at least one physical constant of the processing plant, and determining a control curve on the basis of the value distribution of the process variable for modifying the at least two manipulated variables in order to switch the processing plant from the start state to the end state, taking into account at least one boundary condition.

A key aspect of the invention is accordingly that first of all, prior to carrying out the actual control task, the value distribution of the at least one process variable is established for different value combinations of the at least two manipulated variables. In other words, a modelling operation is performed which simulates the distribution of the values of the process variable for different value combinations of the two manipulated variables. The invention is not limited to two manipulated variables; it would also be possible to establish the influence of more than two manipulated variables, within the manipulation ranges thereof, on one or more process variables of interest, such as, for example, certain pressures within pipelines in a processing plant. In the modelling operation or in the simulation of the value distribution of at least one process variable, it is necessary for one or more process parameters, for example temperature, volumetric flow or a plurality of physical constants in the processing plant, to be taken into account when establishing the value distribution of the at least one process variable. As soon as the value distribution of the at least one process variable, taking into account one or more process parameters, has been completed, that value distribution can be used to determine a suitable control curve specifying the modification of the at least two manipulated variables in order to switch the processing plant from the start state to the end state. The determination of the control curve takes account of at least one boundary condition, enabling an optimum control curve for switching between states to be selected.

The method according to the invention makes it possible to solve in an optimum way any industrial control problem having a plurality of manipulated variables for which a suitable modelling operation can be carried out so that, on the basis of the value distribution of the process variable, an optimum control curve can be found. The value distribution of the process variable as a function of the manipulated variables can be represented graphically as a multi-dimensional space defined by the manipulated variables and the process variable. The term "manipulated variable" can include any modifiable variable that interacts with a processing unit and is able to influence a process in the context of a control problem, for example the modifiable position of industrial valve devices and butterfly valves or the travel of a valve.

It is especially advantageous that it is possible to establish different value distributions of the at least one process variable for different process parameters. For example, the value distribution of the at least one process variable changes in the case of different temperatures, fluid flows or different physical constants within the processing plant. Accordingly, the value distribution of the at least one process variable must be effected taking into account one or more process parameters, which can, however, be different in the case of different processes. For example, it would be possible, prior to switching from a start state of the processing plant to an end state, to make certain assumptions in respect of one or more process parameters and to determine the value distribution of the at least one process variable on the basis of those assumed process parameters. Such a value distribution can be performed for various combinations of process parameters, so that different value distribution curves or planes are obtained for different process parameters and/or combinations thereof. Accordingly, a suitable control curve can be established for each specific value distribution of the at least one process variable, and consequently a plurality of optimum control curves are determined for a plurality of value distributions and can be stored in a computer system.

It is also possible, however, for corresponding feedback signals relating to process parameters to be obtained directly from the process while it is running in order that establishing a value distribution can be suitably optimised during the actual process. In other words, the control curve can be optimised for modifiable process parameters. Modifiable process parameters can accordingly be measured in real time during the actual process and used for establishing a value distribution of the at least one process variable on the basis of the "real-time process parameters". The control curve can therefore be determined as it were in real time on the basis of the up-to-date value distribution of the least one process variable. Overall it is accordingly possible to acquire the process parameters or the process parameter prior to the beginning and/or during the process being controlled in the processing plant and accordingly establish an up-to-date value distribution of the process variable and consequently an up-to-date control curve.

Preferably, each value combination within the manipulation range of the at least two manipulated variables is associated with just one value of the process variable, taking into account one or more process parameters. As explained above, that value can vary in dependence upon one or more process parameters. The value distribution of the process variable within the limits of the manipulation ranges of the at least two manipulated variables can be represented graphically by means of a 3D surface plot or 3D profile which shows the value distribution of a process variable for each value combination of the manipulated variables. It will be understood that different value distributions can be provided for different process variables. In order to generate the value distribution, each value combination within the manipulation range of the at least two manipulated variables is preferably associated with a value of the process variable, taking into account the one or more process parameters. A state of the processing plant is consequently advantageously defined by a value combination of the at least two manipulated variables.

The determination of the control curve is advantageously effected by means of a path search procedure (algorithm), the path search being carried out within the value distribution of the process variable. Consequently, during the path search procedure a suitable path from the start state of the processing plant to the end state of the processing plant is sought, taking into account the at least one boundary condition. The start state of the processing plant is reflected by a first value combination of the at least two manipulated variables and the end state of the processing plant is reflected by a second value combination of the at least two manipulated variables. In other words, each state of the processing plant is defined by co-ordinates of the manipulated variables. The control curve then determines the path that results in the manipulated variables being modified in such a way that the start state of the processing plant is switched to the end state in an optimum way, taking into account at least one boundary condition. The one or more boundary conditions used for determining the control curve can be, for example, a defined limit range of the at least one process variable. If the process variable is a pressure, the boundary condition can be, for example, an upper and a lower pressure boundary which may not be crossed. A boundary condition can also be defined by the manipulation range of the manipulated variables. A further boundary condition can be defined by mechanical characteristics of the processing unit(s).

BRIEF DESCRIPTION OF THE SEVERAL VIEWS OF THE DRAWING(S)

The invention is explained in greater detail below with reference to the drawings, wherein.

DETAILED DESCRIPTION OF VARIOUS EMBODIMENTS

The invention is described hereinbelow using the specific example of "electrical-linkage" for a 2-gate-valve system for decoking a pipeline downstream of the cracked-gas furnace in an ethylene process. The method according to the invention provides a suitable solution, in the form of an optimum control curve, for the control problem "decoking" in the ethylene process. The control problem "decoking" serves merely to illustrate the invention, which is generally applicable to many other control problems in many different processes and is on no account limited to the example described herein, that is to say is limited neither to decoking nor to the ethylene process.

Ethylene is a lightweight hydrocarbon product. Since it does not occur directly in crude oil or in natural gas, ethylene must be generated from intermediates of petroleum and natural gas refining. In principle, ethylene is obtained by decomposing larger molecules. Such decomposition, also called cracking, takes place in ethylene plants. Such an ethylene plant is shown in FIG. 1.

There are primarily two methods of producing ethylene that are used on a large scale and they differ essentially by their areas of use: in areas rich in natural gas (for example the Middle East), ethylene is generated from ethane which in those areas is obtained as a secondary product. In Europe, ethylene is mainly obtained from crude petroleum ("naphtha"). The crude petroleum is in turn obtained in petroleum refineries. Plants for producing ethylene are therefore generally located within or at least in the vicinity of refineries. In the ethylene plant, the liquid hydrocarbons are cracked into gaseous reaction products and converted into high-quality products by means of a plurality of separating and purifying processes.

Figure 1:
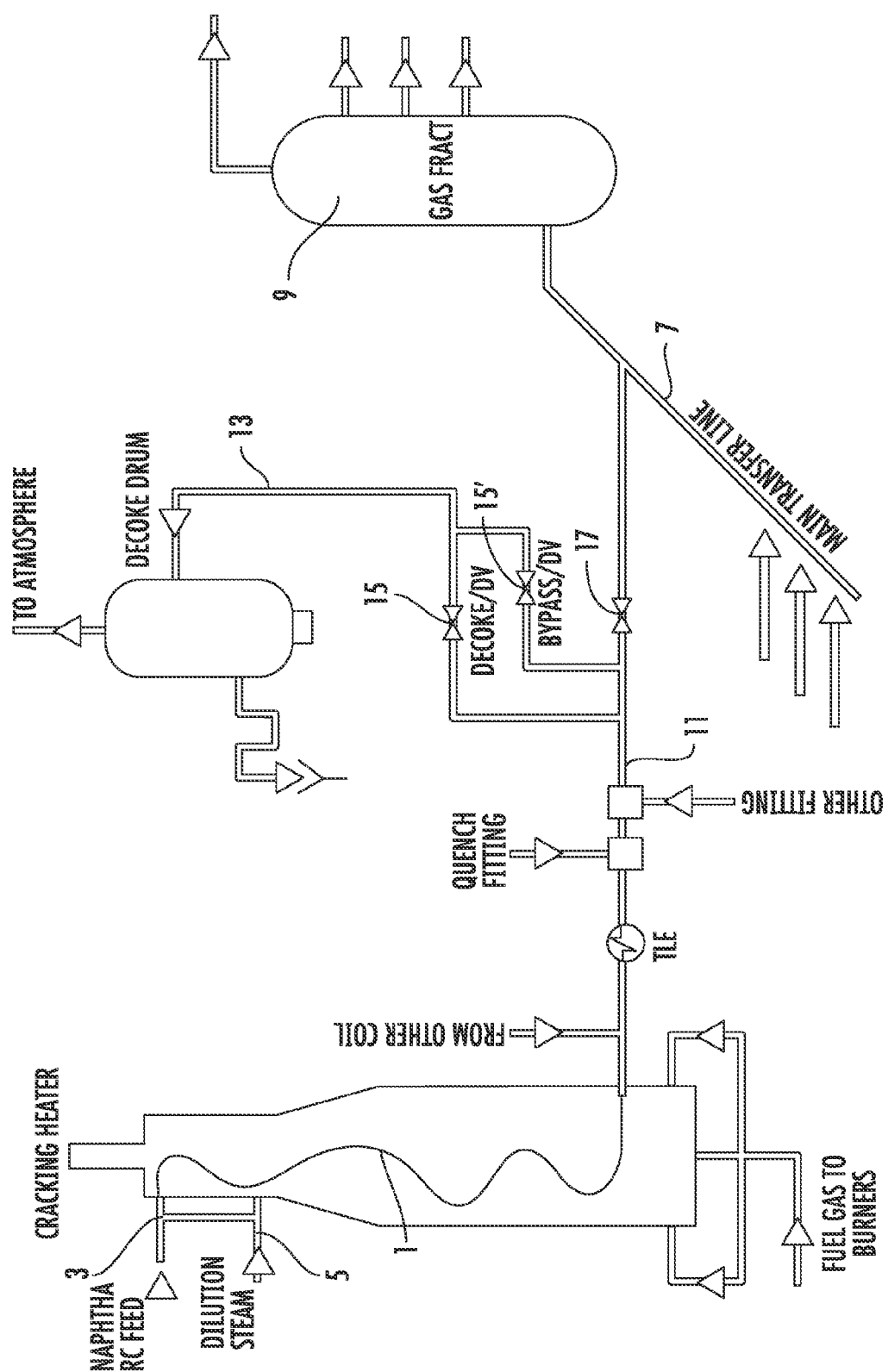
FIG. 1 is a diagrammatic view of a known ethylene generation plant.

Ethylene is produced by steam pyrolysis in a reactor 1 (cracked-gas furnace) by means of the stream-cracking method in accordance with FIG. 1. The reactor is supplied with hydrocarbon via a first supply line 3 and with steam via a second supply line 5. For cracking, the hydrocarbon is mixed with the steam and preheated to from 500 to 650° C. In the reactor 1, the mixture is cracked at temperatures of between 700° and 900° C. The resulting product stream of a plurality of production lines is then fed via a product mainline 7 (Main Transfer Line) to connected systems 9 for further processing.

Over the production process, solid hydrocarbons accumulate in a product line 11 (Transfer Line), which is connected to the product mainline 7, in the form of baked-on deposits and residues. These increasingly reduce the free cross-section of the line and in this way alter the process characteristics. In order to eliminate these troublesome residues, the plant has to be "decoked" from time to time. For this purpose, the feed supply to the reactor 1 is discontinued and a suitable amount of steam introduced, which is finally expelled together with loosened coke residues via a decoking line 13 (Decoke Line). Once the decoking process is complete, the ethylene plant is switched over to the production state again, so that the product from the reactor 1 can again be supplied via the product line 11 to the product mainline 7.

For application in the ethylene process there are used, by way of example, bridge pipe gate valves 15 and 17 which are connected downstream of the reactor 1. In the normal state (production) of a corresponding production line, the process valve 17 (Transfer Line Valve, TLV) in the product line 11 is in a fully open state, while a decoking valve 15 (Decoke Valve, DV), which has a smaller nominal width than the process valve 17, in the decoking line 13 is completely closed.

In order to bring about the above-described decoking state of the ethylene plant, the decoking valve 15 must be fully open, while the process valve 17 is completely closed. Depending upon the type of plant, it is possible to connect in parallel a second decoking valve 15' which has a larger nominal width than the first decoking valve 15 and which, once the processing plant has been switched to the "decoking state", opens additional cross-section of the line.

The transition between the static processing plant states described (TLV open, DV closed and TLV closed, DV open) must take place with particular consideration being given to the state of the plant. For this purpose, in particular the pressure PT01 in the line section upstream of the process valve 17 is significant (see FIG. 2), since that pressure is directly influenced, via corresponding constant process and medium parameters, by the aperture cross-section opened by the two valves 15 and 17 and is critical to plant safety. If the pressure PT01 is too high, the pipeline is at risk, but if the pressure PT01 is too low, there is a risk that the product will flow back out of the product mainline 7 into the reactor 1, because ethylene plants connected in parallel are continuing supply via the product mainline 7. The pressure PT01 in the present example consequently forms a process variable which it is essential to take into account in the transition between processing plant states because it is affected by the two valves 15 and 17. In the present example, the two valves 15 and 17 are each directly associated with a manipulated variable that corresponds to an aperture cross-section of the lines 11 and 13, respectively.

For the control problem "decoking" in the ethylene process, the processing plant must therefore undergo a transition from a start state to an end state which is defined by a transition between the two plant states "processing" and "decoking". That transition must usually take place by simultaneous movement of the two valves 15 and 17 in opposite directions, as explained in more detail below. This can be realised both by means of mechanical coupling (Mechanical Linkage) and by means of electrical control systems (Electrical Linkage).

Figure 2:
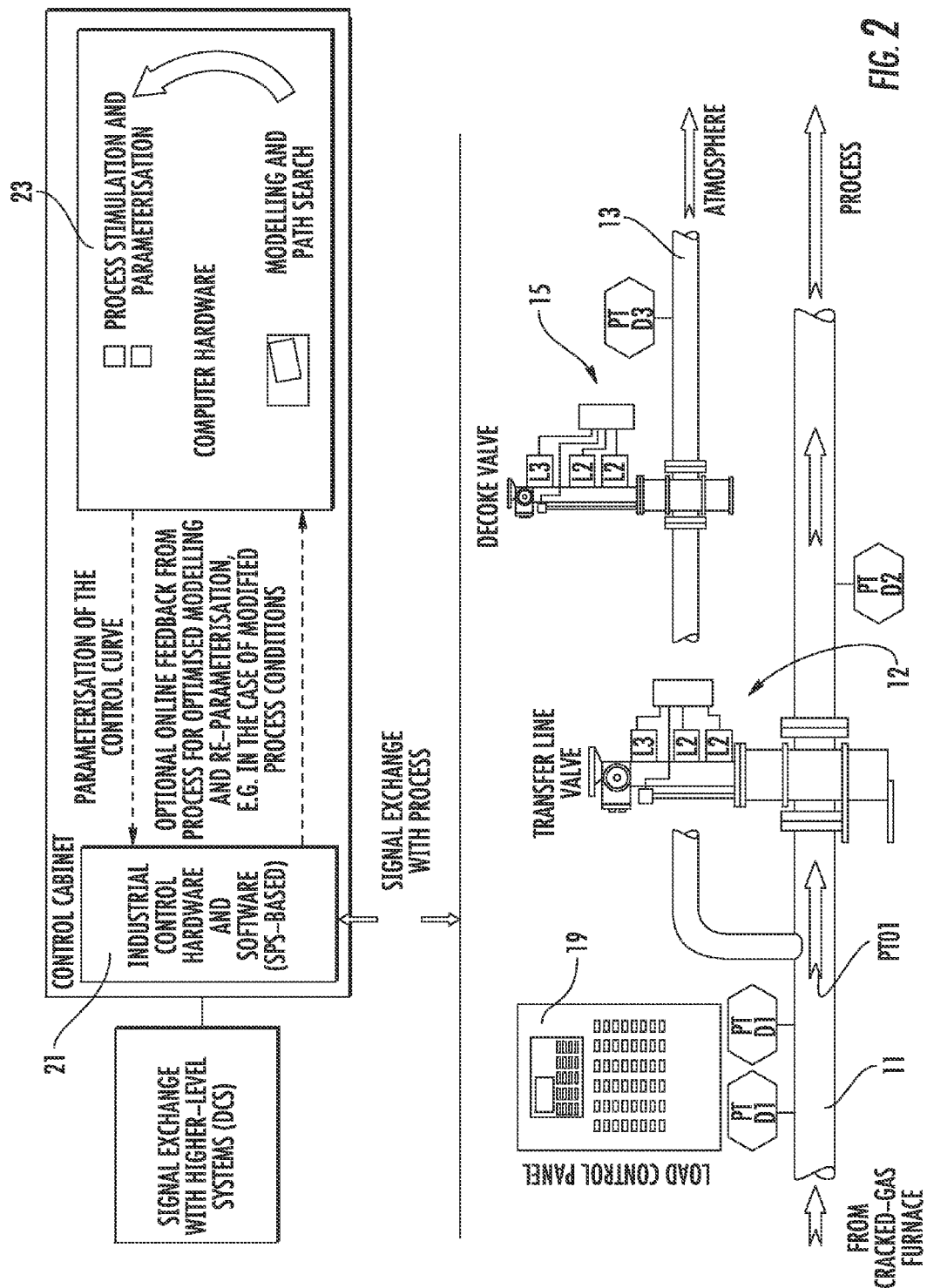
FIG. 2 is a diagrammatic view of an electrical-linkage system making use of the present invention.

A typical system arrangement for an electrical control system is shown in FIG. 2. The significant elements for the control problem "decoking" are the decoking valve 15 (DV) and the process valve 17 (TLV) of the ethylene plant, the aperture cross-sections of which are affected by adjusting drives and corresponding instrumentation. Corresponding process parameters, such as pressures in the line sections and also temperature and through-flow measurements, provide information relating to the process state and the medium characteristics. These process parameters are preferably measured during the process by means of suitable measuring devices and/or are stored in the form of empirical values, for example in a computer.

The transition between the processing plant states is usually initiated from a local operating console 19 (Local Control Panel, LCP). For switching the ethylene plant from the static state "processing" to the static state "decoking", the two valves 15 and 17 must perform a suitable movement. In accordance with the prior art, the movement of the two valves 15 and 17 is controlled by means of an electrical control system in which standard closed-loop control circuits (PID controllers) are used. In the case of control systems known from the prior art, for this purpose the decoking valve 15 (DV) is in the form of a "control valve" which, during constant movement of the process valve 17 (TLV), effects closed-loop control in dependence upon the pressure PT01 in the line section upstream of the process valve 17 in the direction of flow as controlled variable and in dependence upon the travel of the decoking valve 15 as manipulated variable. For that purpose, special closed-loop control drives are used, the valve mechanism being subjected to very great stress, however, by the short travel movements performed, in some cases at high frequency. As a result, service lives are reduced and the likelihood of malfunction increased.

The present invention solves this problem in that the method according to the invention takes account of significant factors, such as the characteristics of the valve mechanism or changes in process characteristics.

A system so equipped is shown in FIG. 2 in which the signal exchange between the control means and the processing plant is effected by means of industrial control hardware 21 which is coupled to computer hardware 23. The computer hardware 23 is especially designed for modelling, for path searching and for process simulation and parameterisation.

The applicability of the invention to the exemplary control problem "decoking" in the context of the electrical control system (E-linkage) is explained below.

In principle, the invention relates to industrial control problems having a plurality of manipulated variables which are able to form the basis of a multi-dimensional parameter space in which a path search can then be carried out to solve a specific control problem.

Figure 3:
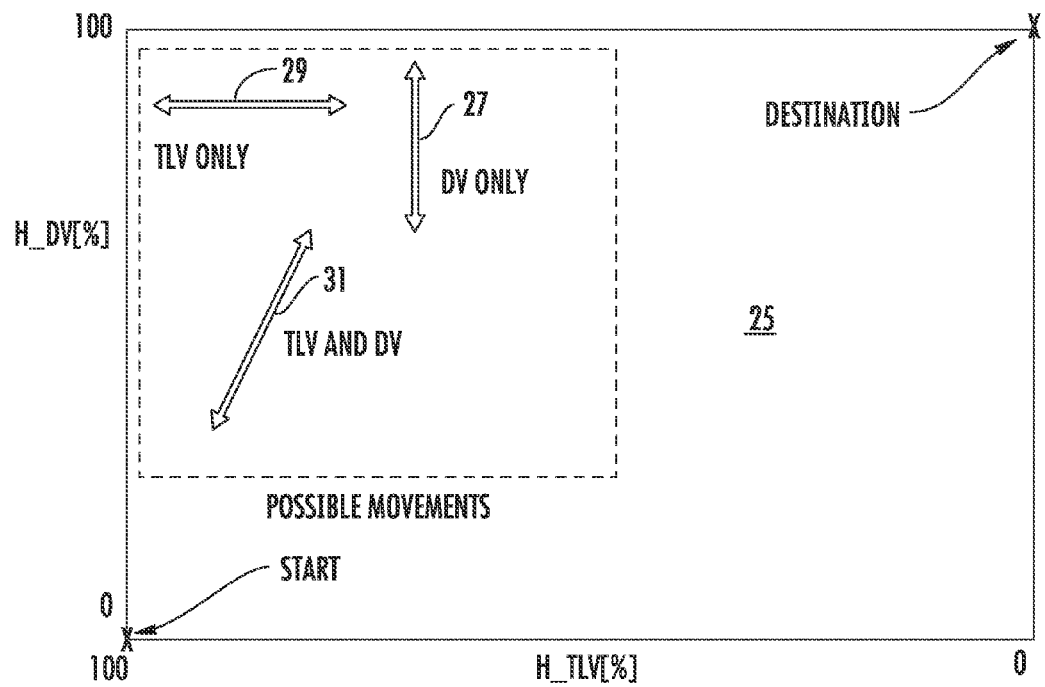
FIG. 3 is a diagrammatic view of a base area of a parameter space defined by two manipulated variables.

In the case of the electrical control system of the kind addressed herein, two manipulated variables are available in the form of the travel of the valves 15 and 17 which, by way of their travel, act on the process or significantly on the pressure PT01 in the line section upstream of the process valve 17. Graphically these two manipulated variables therefore define the base area 25 for a parameter space, as shown in FIG. 3. It will be understood that in the present example only two manipulated variables are provided, while in other examples more than two manipulated variables can be provided. In FIG. 3, the travel of the process valve 17 forms the x-axis (H_TLV [%]) of the base area 25, while the travel of the decoking valve 15 forms the y-axis (H_DV [%]). The manipulation range of the travel of the two valves 15 and 17 ranges from 0% to 100% and from 100% to 0%, respectively, which corresponds to minimum travel and maximum travel of the valves. The range between the minimum travel and the maximum travel consequently forms the manipulation range of the valves.

A state of the processing plant is defined by a certain co-ordinate (x, y) on the base area 25 which is obtained by combining the values of the first manipulated variable and the second manipulated variable. In FIG. 3, a start state A of the processing plant, in the present example the "processing" state, is indicated by the co-ordinate (100, 0). In this state, the decoking valve 15 is fully closed (travel DV=0%), while the process valve 17 is fully open (travel TLV=100%). Furthermore, in FIG. 3 an end state B of the processing plant, in the present example the "decoking" state, is indicated by the co-ordinate (0, 100). In this state the decoking valve 15 is fully open (travel DV=100%), while the process valve 17 is fully closed (travel TLV=0%).

Movements between processing plant states A and B are carried out by modifying the manipulated variables in the range between 0% and 100%. The control problem in that case lies in modifying the manipulated variables H_TLV and H_DV, taking into account the process variable, in the present example the pressure PT01, in such a way that the control curve follows an optimum course in respect of at least one boundary condition which may be that the pressure PT01 remains within a desired limit range during the transition between states. In principle, by suitably influencing the manipulated variables H_TLV and H_DV, any desired movements on the base area 25 are possible and can be represented by the method according to the invention. Insofar as adjusting drives having a constant adjustment speed are used, however, the possible movements of the valves and therefore the movement of the manipulated variables on the base area are limited.

Accordingly, switching the processing plant from state A to state B must take place by way of defined movement vectors acting in both directions. FIG. 3 shows that vertical and horizontal movements 27 and 29 are possible by modifying only one manipulated variable H_TLV or H_DV. Furthermore, transverse movements 31 on the base area 25 can take place at an angle proportional to the ratios between the adjustment speeds of the valve drive means. Such possible movements are taken into account in the subsequent path search over the parameter space, which will be explained below.

The starting situation for applying a path search procedure is usually the specification of a start point and an end point. In the present example, for example, the start state is the valve arrangement in the processing state (state A) and the destination is the decoking state (state B) in accordance with FIG. 3. Accordingly, all the prerequisites for applying path search algorithms to the control problem of an electronic control system are present.

The processing plant could then be switched to the desired destination state B without taking a process variable into account, for example with the proviso of finding the shortest route between the states A and B and storing that route as a control curve in the industrial control means. As explained above, however, it is essential to pay attention to corresponding process variables in order to ensure plant safety. In the present example, as stated above, the pressure PT01 in the line section upstream of the process valve 17 must be kept within a limit range, that is to say it may not fall below a minimum or exceed a maximum.

In accordance with the present invention, the process variable PT01 and the influence of the manipulated variables H_DV and H_TLV on that process variable is taken into consideration in searching for a path between states A and B. Such consideration takes the form of performing a suitable modelling operation in order to solve the control problem, which modelling operation describes the relationship between the two manipulated variables H_DV, H_TLV and the process variable PT01 affected. This procedure can be applied to more than two manipulated variables and to any one or more process variables that are affected by the manipulated variables.

The modelling is carried out, especially in the ethylene process, using medium properties, such as volumetric flow and temperature, and also physical constants that result in a relationship between the manipulated variables H_TLV, H_DV and the process variable PT01 affected. In other words, the process variable PT01 is determined in each case for fixed process parameters, such as volumetric flow (FT01) and temperature (TT01) etc., prior to the transition between states being performed.

Since the process parameters, such as volumetric flow and temperature etc., can vary, the modelling can be effected separately for different variables of the process parameters. The modelling then results in multi-dimensional data structures which are stored as it were as families of curves in the industrial control means. This can be done optionally or additionally "online" on the basis of up-to-date measured process parameters. Accordingly, the subsequent procedure is applied either multiple times in advance (offline) of the control task or the process and/or while the process is running (online).

The modelling is effected by establishing a value distribution of the process variable PT01 for different value combinations of the two manipulated variables H_TLV and H_DV within the manipulation range thereof, taking into account one or more process parameter(s), especially a temperature, a volumetric flow or at least one physical constant of the processing plant. As indicated above, the value distribution of the process variable PT01 is dependent upon the manipulated variables H_TLV and H_DV and upon one or more process parameter(s), because the pressure PT01 is also dependent upon the processing temperature and upon the nature of the medium etc. On the basis of the resulting dependencies it is possible to construct a system of equations. If this system of equations (for example by means of a zero search) leads to an unambiguous result, a corresponding pressure PT01 is obtained for each co-ordinate (x, y) on the base area 25. Consequently there is obtained a value distribution of the process variable PT01 as a function of different value combinations of the two manipulated variables H_TLV and H_DV. For each/all defined process parameter(s) there is accordingly obtained a different value distribution for value combinations of the manipulated variables. These different value distributions form the above-described "families of curves" which can be stored in a computer system.

Figure 4:
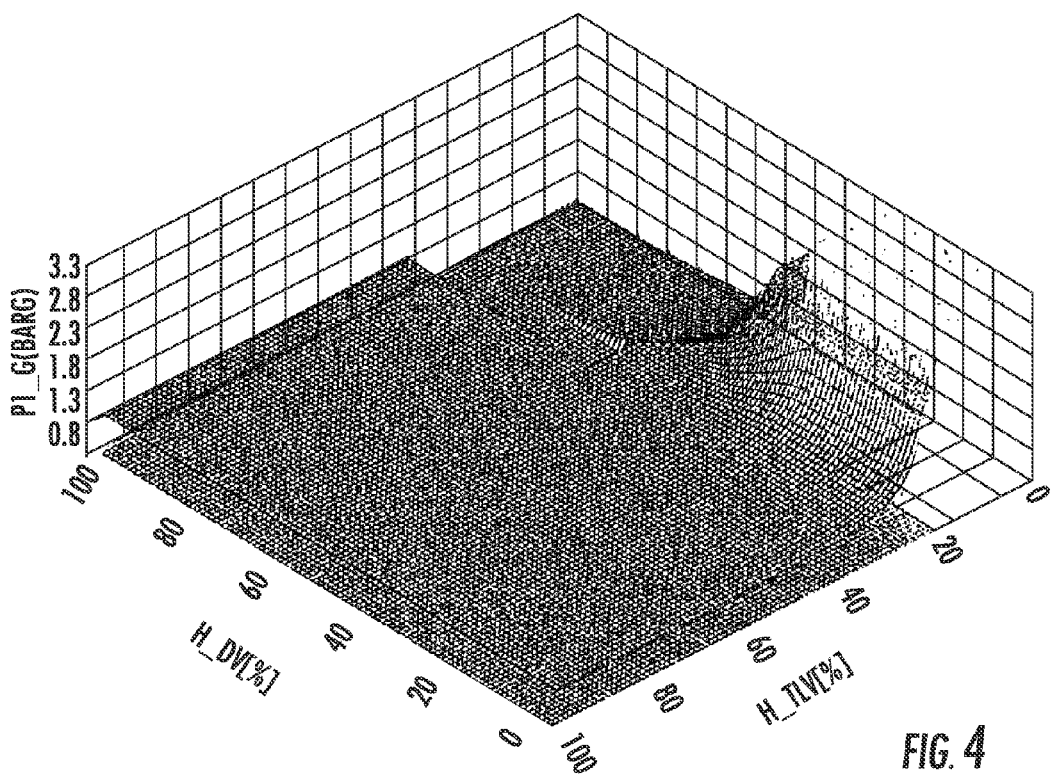
FIG. 4 is a diagrammatic view of a three-dimensional parameter space after establishing a value distribution of a process variable for different value combinations of two manipulated variables.

The value distribution of the process variable can be interpreted as a "3D surface plot" and accordingly converts the base area into a three-dimensional distribution, as shown in FIG. 4. Graphically the modelling therefore results in a 3D parameter space having the process variable PT01 as "height" which indicates the pressure distribution for various, preferably all, value combinations of the manipulated values H_TLV and H_DV.

Figure 5:
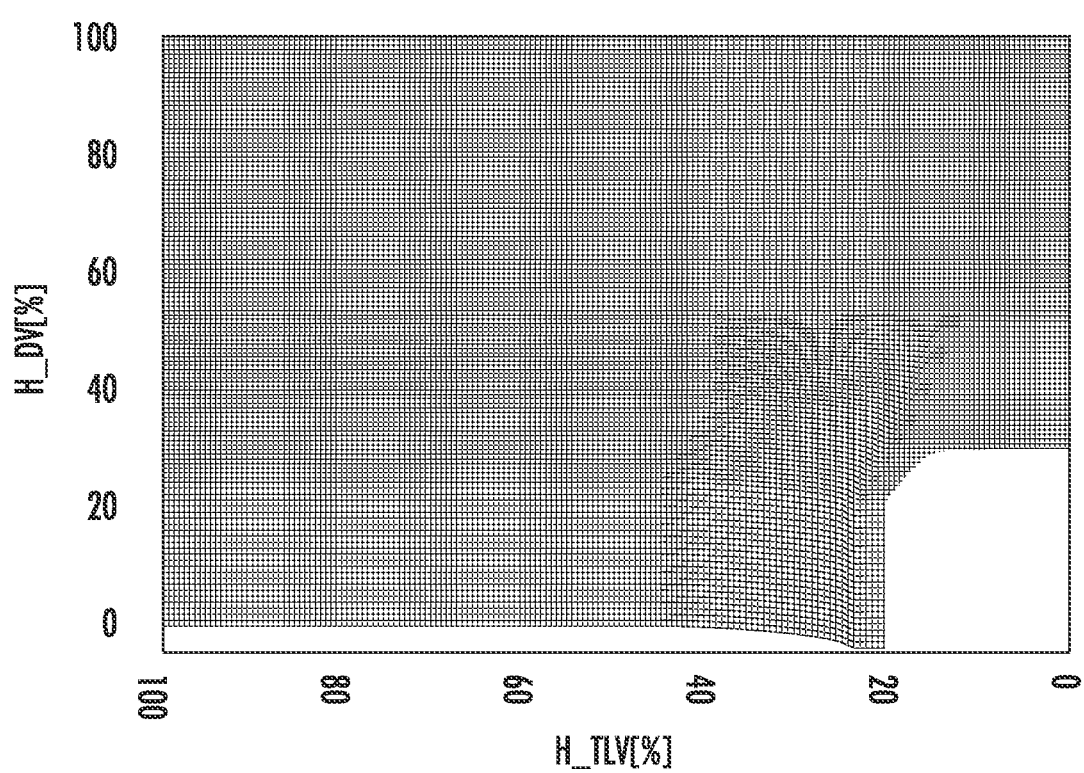
FIG. 5 is a diagrammatic view of the parameter space as a projection of the value distribution of a process variable onto the base area of the parameter space.

As explained at the beginning, the plant states "processing" (state A) and "decoking" (state B) then mark suitable start and end states between which the processing plant must be routinely switched, as can be seen from FIG. 5. FIG. 5 shows the 3D surface plot in accordance with FIG. 4 projected onto the base area 25. According to the invention, the modelling in accordance with the first step of the method according to the invention is then used to determine in a second step a control curve on the basis of the value distribution of the process variable PT01 which serves for modifying the two manipulated variables H_TLV and H_DV in order to switch the processing plant from start state A to end state B. For this purpose it is possible to use suitable path search procedures which are capable of taking into account boundary conditions and optimality parameters.

A significant boundary condition can be, for example, the defining of a permissible pressure band for the pressure PT01 in the light of the plant safety requirements described at the beginning. A pressure band is to be understood as being a limited pressure range having a minimum pressure and a maximum pressure which the pressure must not fall below or exceed, respectively. The control curve is then determined in such a way that the pressure PT01 remains within a desired limit range during modification of the manipulated variables H_TLV and H_DV. Furthermore, a boundary condition can be specified by the possible directions of movement of the manipulated variables shown in FIG. 3. In addition, it would be possible to provide a further boundary condition by means of further restrictions, such as, for example, a maximum number of stops and restarts of the adjusting drives. The above-mentioned list of boundary conditions that can be taken into account when determining the control curve is not exhaustive. In particular, it would also be possible to take into account a plurality of boundary conditions simultaneously in the determination of the control curve.

Furthermore, it is possible for optimality parameters to be taken into account in the determination of the control curve, these parameters generally being understood as quality criteria which suitably influence the course and the result of the path search and therefore the determination of the control curve as a solution to the control problem, but always giving consideration to the observation of the necessary boundary conditions.

For example, it would be possible to perform a search for a path in the value distribution of the pressure PT01 which finds the shortest possible and therefore fastest possible route between states A and B of the processing plant, while at the same time keeping the pressure PT01 within permissible limits by means of the corresponding boundary condition. Furthermore, it can also be desirable, however, to keep the pressure PT01 substantially constant and in the middle of the permissible pressure band (between the limit values of the pressure PT01) and to place less emphasis on the duration of the transition between states as a criterion of the path search. In that respect, a large number of different variants and differently weighted mixed forms, which can vary in dependence upon the control problem to be solved, is a possibility.

The key factor is that each solution to the control problem, that is to say each control curve, ends in suitable parameterisation of the industrial control hardware which, by means of signal exchange with and influence on the process, is responsible for the actual control problem. By storing families of curves for different process conditions (process parameters) it is possible to develop flexible control means that can be adapted to many different processes. The optional coupling of the method to the process online (via control hardware) allows an integrated control circuit with further scope for calculation and optimisation of the method by means of learning algorithms.

In the present case, the application of the method according to the invention has been explained by way of example on the basis of a control problem for the ethylene process, with attention being paid to the process characteristics and the resulting demands on the control system. Attention was then paid to the solution to this control problem having two manipulated variables by the application of path search algorithms to a value distribution of a process variable in a multi-dimensional parameter space, taking into account boundary conditions and optimality criteria.

Overall, the present invention provides an advantageous method for solving a control problem, wherein, in a first step, a value distribution of the at least one process variable for different value combinations of the at least two manipulated variables within the manipulation range thereof is established, this being effected while taking into account one or more process parameter(s), especially a temperature, a volumetric flow or at least one physical constant of the processing plant. Accordingly, in this first step the behaviour of at least one critical process variable as a function of a plurality of manipulated variables and at least one process parameter is simulated or modelled. The simulation can be implemented by means of suitable computer software and executed on a computer system.

In a second step, to solve the control problem a control curve is established on the basis of the value distribution of the process variable. In other words, the simulated course of the process variable is used to establish a suitable control curve. The control curve defines the modification over time of the at least two manipulated variables in order to switch the processing plant from the start state to the end state, the control curve defined taking into account at least one boundary condition. The control curve can be determined on the basis of various criteria which can have greater or less importance in the determination.

A suitable algorithm, especially a path search procedure, can be used in establishing the control curve. It is particularly advantageous that the value distributions of the at least one process variable, that is to say the simulated course or the simulated distribution of the process variable for different value combinations of the manipulated variables and the suitable control curve, can be stored in a computer system prior to the performance of the control task or even prior to the process. For performing the control tasks it is then necessary simply to access the stored control curve.

It is also possible to define different control curves for different process parameters, for example different temperatures or volumetric flows within the processing plant. When the control task is performed, it is then necessary only to acquire the up-to-date process parameters and apply the appropriate control curve to the manipulated variables.

It will be understood that the process variable need not be pressure, but rather, in an embodiment of the invention, the critical process variable can be a temperature or the like, while the pressure provides a process parameter that is merely taken into account in the simulation of the process variable, namely the temperature.

LIST OF REFERENCE NUMERALS 1 reactor
3 1st supply line
5 2nd supply line
7 product mainline
9 connected systems
11 product line
13 decoking line
15 decoking valve
15' decoking valve
17 process valve
19 local operating console
21 control hardware
23 computer hardware
25 base area
27 vertical movement
29 horizontal movement
31 angular movement
PT01 pressure
A start state
B end state That which is claimed:

1. Method for switching a processing plant from a start state (A) to an end state (B), by modification of at least two manipulated variables (H_DV, H_TLV) within the manipulation range thereof, wherein the manipulated variables are associated with at least two processing units, and wherein the at least two manipulated variables (H_DV, H_TLV) affect at least one process variable (PT01) of the processing plant, and wherein the method comprises the following steps:
  establishing a value distribution of the at least one process variable (PT01) for different value combinations (x, y) of the at least two manipulated variables (H_DV, H_TLV) within the manipulation range thereof, said establishing of the value distribution being based at least in part upon one or more process parameter(s); and
  determining a control curve on the basis of the value distribution of the process variable (PT01) for modifying the at least two manipulated variables (H_DV, H_TLV) in order to switch the processing plant from the start state (A) to the end state (B), said determining of the control curve being based at least in part upon at least one boundary condition, said switching of the processing plant from the start state (A) to the end state (B) occurring via simultaneous movement of the at least two processing units in opposite directions and in response to the modifying of the at least two manipulated variables, said simultaneous movement of the at least two processing units in opposite directions being controlled via an electrical controller associated with the at least two manipulated variables.

2. Method according to claim 1, wherein different value distributions of the at least one process variable are established for different process parameters.

3. Method according to claim 1, wherein the process parameters are acquired at least one of prior to the beginning or during the process being controlled in the processing plant.

4. Method according to claim 1, wherein at least one of the at least two manipulated variables (H_DV, H_TLV) influences throttling of a flow of liquid or gas.

5. Method according to claim 1, wherein each value combination (x, y) within the manipulation range of the at least two manipulated variables (H_DV, H_TLV) for generating the value distribution is associated with a value of the process variable (PT01) based at least in part upon the one or more process parameters.

6. Method according to claim 1, wherein a state of the processing plant is defined by a value combination (x, y) of the at least two manipulated variables (H_DV, H_TLV).

7. Method according to claim 1, wherein the control curve is determined on the basis of a path search procedure in the value distribution of the process variable (PT01) which seeks a suitable path from the start state (A) of the processing plant to the end state (B) based at least in part upon the at least one boundary condition.

8. Method according to claim 1, wherein a defined limit range of the at least one process variable (PT01) provides the boundary condition.

9. Method according to claim 1, wherein the boundary condition is defined by the manipulation range of the manipulated variables (H_DV, H_TLV).

10. Method according to claim 1, wherein the boundary condition is defined by mechanical characteristics of the processing unit(s).

11. Method according to claim 1, wherein the one or more processing unit(s) are at least one of valves, valve devices or butterfly valves.

12. Method according to claim 1, wherein the at least one process variable (PT01) is a pressure.

13. Method according to claim 1, wherein the one or more process parameters(s) taken into account comprise at least one of a temperature, a volumetric flow, or at least one physical constant of the processing plant.

14. Method for switching a processing plant from a start state (A) to an end state (B), by modification of at least two manipulated variables (H_DV, H_TLV) within the manipulation range thereof, wherein the manipulated variables are associated with one or more processing unit(s), and wherein the at least two manipulated variables (H_DV, H_TLV) affect at least one process variable (PT01) of the processing plant, and wherein the method comprises the following steps:
  establishing a value distribution of the at least one process variable (PT01) for different value combinations (x, y) of the at least two manipulated variables (H_DV, H_TLV) within the manipulation range thereof, said establishing of the value distribution being based at least in part upon one or more process parameter(s); and
  determining a control curve on the basis of the value distribution of the process variable (PT01) for modifying the at least two manipulated variables (H_DV, H_TLV), wherein the control curve defines a modification over time of the at least manipulated variables for switching the processing plant from the start state (A) to the end state (B), wherein the defined modification result in, via an electrical controller, movement of the one or more processing unit(s), and wherein said determining of the control curve is further based at least in part upon at least one boundary condition.

15. Method according to claim 14, wherein the one or more processing unit(s) are at least one of valves, valve devices or butterfly valves.

16. Method according to claim 14, wherein the at least one process variable (PT01) is a pressure.

17. Method according to claim 14, wherein the one or more process parameters(s) taken into account comprise at least one of a temperature, a volumetric flow, or at least one physical constant of the processing plant.

* * * * *

UNITED STATES PATENT AND TRADEMARK OFFICE
CERTIFICATE OF CORRECTION

PATENT NO.        : 9,501,064 B2                                        Page 1 of 1
APPLICATION NO.   : 13/892723
DATED             : November 22, 2016
INVENTOR(S)       : Knoedler It is certified that error appears in the above-identified patent and that said Letters Patent is hereby corrected as shown below:

In the Claims

Column 12
Line 1, "controlled via an electrical controller associated with the at least two manipulated variables.""
should read --controlled via an electrical controller.--

Column 13
Line 2, "result" should read --results--

Signed and Sealed this
Twenty-eighth Day of March, 2017

Michelle K. Lee
*Director of the United States Patent and Trademark Office*